July 30, 1935.  E. L. BARRETT  2,009,425
SYSTEM AND MEANS FOR TRANSFORMING DIRECT CURRENT
Filed Jan. 19, 1934
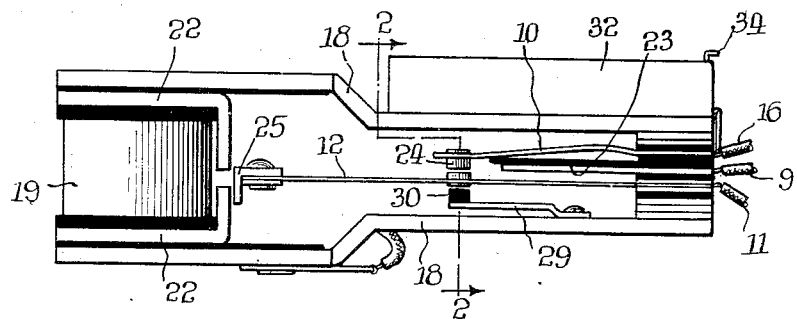
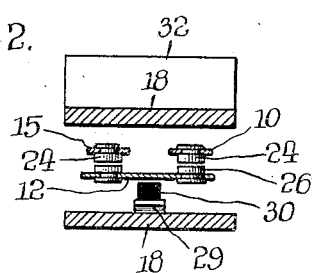
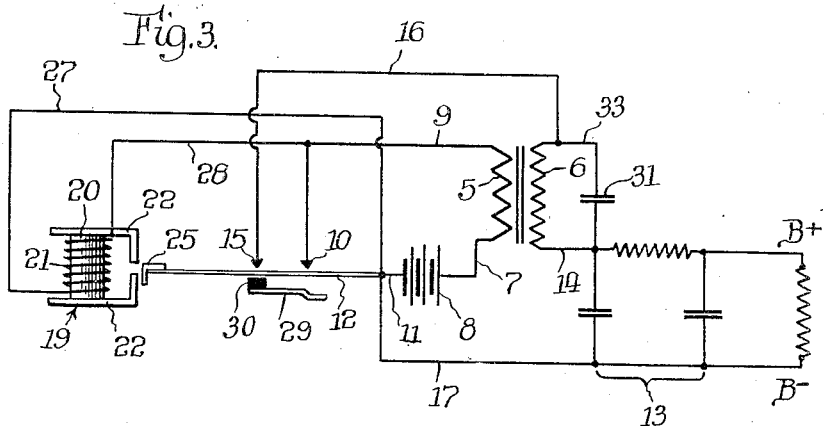
Inventor:
Edward L. Barrett,
By Chindahl, Parker & Carlson
Attys.

Patented July 30, 1935

2,009,425

UNITED STATES PATENT OFFICE 2,009,425

SYSTEM AND MEANS FOR TRANSFORMING DIRECT CURRENT

Edward L. Barrett, La Grange, Ill., assignor to Utah Radio Products Company, Chicago, Ill., a corporation of Illinois Application January 19, 1934, Serial No. 707,308

2 Claims. (Cl. 171—97)

The invention relates to a system for the transformation of direct current and particularly to a direct current transforming system intended to replace the "B" battery customarily employed to supply direct current to one circuit of a radio receiving set.

An object of the invention is to provide a novel and improved system which is simple and reliable, is easily and cheaply manufactured, and which has a high operating efficiency.

A more particular object of the invention is the perfection of a simple direct current transforming system employing electro-mechanical means for rectifying the transformed current.

Another object of the invention is to provide a novel system for transforming direct current wherein a single moving part is operable to interrupt a direct current flow to a primary winding of a transformer so that the flow, in effect, has half-wave characteristics, and to rectify half of the current flow from the secondary winding of the transformer to produce a direct current.

Another object is to provide a novel and simplified electro-magnetically actuated switching means for controlling the circuits of the system and in particular to provide such a switching means wherein the two contacts, which are movable to make and break the circuits of a half-wave transforming system, are mounted on the same face of a vibratory arm or reed.

Other objects and advantages will become apparent from the following detailed description taken in connection with the accompanying drawing, in which:

Figure 1 is a side elevational view of a circuit controlling means employed in the system.

Fig. 2 is a transverse sectional view taken approximately along line 2—2 of Fig. 1.

Fig. 3 is a wiring diagram illustrating a direct current transforming system embodying the features of the invention.

Generally speaking, transformation of direct current of one potential to direct current of a different potential involves interrupting or varying the direct current to obtain an intermittent or pulsating current, transforming the same to a desired potential, and rectifying the alternating current resulting. Devices of the type to which the present invention relates are especially adapted for use in connection with automobile installations of radio receiving apparatus and the source of direct current transformed by such devices in this environment is the storage battery of the vehicle.

In the system herein illustrated an induction coil is provided which has the usual primary winding 5 and secondary winding 6. One end of the primary winding 5 is connected by a lead 7 to the negative terminal of the source of direct current to be transformed, here shown as a vehicle storage battery 8. The other end of the primary winding 5 is connected by a lead 9 to a contact 10, while the positive terminal of the battery 8 is connected by a lead 11 to a contact 12 positioned to cooperate with the contact 10 to complete a supply circuit for the primary winding of the induction coil. Contacts 10 and 12 thus form a switch the opening and closing of which varies the flow of current in the primary winding thereby causing an alternating current to be induced in the secondary winding 6.

Rectification of the alternating current so induced in the secondary winding 6 is effected in a simple electro-mechanical manner by the controlled completion and interruption of a circuit including the secondary winding 6 in timed relation to the completion and interruption of the primary winding supply circuit. This secondary or rectifying circuit comprises a lead 14 connected between one end of the winding 6 and a filter system 13, a contact 15 connected by a lead 16 to the other end of the secondary winding 6, the contact 12, and a lead 17 connected between the contact 12 and the filter system 13 thus connecting the secondary winding 6 to a load across output leads B+, B—. Contacts 12 and 15 constitute a switch which controls the load circuit and which is operated in unison with the switch 10, 12 so that only the first half of the current wave induced in the secondary winding 6 is permitted to flow to the filter system and to load. Thus it is seen that by the proper use of two simple circuits coordinated to be made and broken in the proper timed relationship direct current of one potential can be transformed to direct current of a different and usually higher potential.

It will be apparent from the foregoing description that the contact 12 is common to the supply circuit and to the load circuit and thus controls both circuits. It is this control of both circuits by a single or common contact that simplifies the construction of the transforming system and assures a proper coordination between the making and breaking of the primary winding supply circuit and the making and breaking of the secondary winding load circuit under all operating conditions.

In the operation of the system, the common contact 12 is preferably actuated to make and break the supply and load circuits with a relatively high frequency. Such actuation is effected by electromagnetic circuit controlling means of which the common contact 12 and the contacts 10 and 15 are a part. In this instance, the electromagnetic means comprises an elongated frame composed of substantially parallel side plates 18 bolted together at their ends. Mounted at one end of the frame is an electromagnet 19 comprising a core 20, a coil 21 wound thereon, and pole pieces 22 secured to the ends of the core. These pole pieces extend longitudinally toward the other end of the frame and beyond the coil 21 at which point they are turned inwardly toward one another to lie in substantially the same plane.

Mounted on the other end of the frame are the contacts 10, 12 and 15. Each of these contacts is in the form of an elongated, flat, resilient member extending longitudinally of the frame and fixed at one end in suitably insulated relation. Contacts 10 and 15 are formed as narrow strips and are mounted in laterally spaced relation in the same plane (see Fig. 2). Extending below each of the contacts 10 and 15 is an elongated, rigid finger 23 preferably engaging the contact only near its free end and fashioned to place the contact under a slight tension. The fingers are suitably insulated from the contacts. The contacts extend approximately half way to the electromagnet and at their free ends carry contact points 24.

The common contact 12 is a wide, normally untensioned member positioned in a plane parallel with the plane of the contacts 10 and 15. The contact 12 is longer than contacts 10 and 15 and extends to a point substantially adjacent to the inturned ends of the pole pieces 22, where the contact 12 carries an armature 25. The relationship between armature 25, contact 12 and the pole pieces is such that the armature is supported for swinging movement along a path which is closely adjacent to the plane in which the pole pieces are located but parallels said plane, thus positively insuring that the armature can not strike the pole pieces. In its normal, untensioned position, the contact 12 supports the armature 25 out of magnetic center position with respect to the electromagnet so that when the latter is energized the force exerted on the armature 25 will cause it to swing away from its normal position and toward the contacts 10 and 15. A pair of laterally spaced contact points 26 are mounted on the same face or side of the contact 12 for simultaneous engagement with the contact points 24 when the contact 12 swings from its normal position.

The contact 12 is caused to vibrate by repeated energization and deenergization of the electromagnet. Herein such energization and deenergization is also controlled by the contact 12. To this end, the coil 21 of the electromagnet is connected, by leads 27 and 28, in series with the battery 8 and the winding 5, and in parallel with the contacts 10 and 12 which when closed complete a shunt circuit around the coil 21. Thus when the contact 12 is in normal position the coil 21 is in series with the battery 8 and the electromagnet becomes energized and swings the armature 25. In this movement, the contacts 10, 12 and 15 are closed, the contact 12 is tensioned, and the contacts 10 and 15 are flexed away from the fingers 23 to be further tensioned. Closure of the contacts 12, 10 shunts out the coil 21 with a resultant effective deenergization of the electromagnet. Such deenergization permits the tension in the contacts to impel the contact 12 toward its normal position whereupon the shunt circuit is broken, the electromagnet reenergized and the armature again attracted.

In order that the swing of the contact 12 beyond normal position in either direction may be of substantially the same amplitude, I provide a buffer finger 29 located on the side of the contact 12 opposite the contacts 10 and 15. The finger 29 is secured, as by riveting at one end to one of the side plates 18, to extend parallel with the contacts 10 and 15 and substantially centrally of the contact 12 and terminates below the contact points 24 and 26 in a contact engaging buffer point 30 of insulating material. In the normal position of the contact 12 the spacing between the buffer point 30 and the contact 12 is such that the buffer finger limits the swing of the contact 12 in one direction just as the contacts 10 and 15 limit it in the other direction. Thereby a uniform and high frequency movement of the contact 12 is obtained.

To avoid sparking across the contacts 12 and 15 I provide a condenser 31 connected in parallel with the secondary winding 6. This condenser is conveniently enclosed in a rectangular casing 32 and mounted on one of the side plates 18 of the frame. One plate of the condenser is permanently connected by a lead 33 to the lead 16 while the other plate is connected to a terminal 34 brought out on the casing 32 for convenient connection to the secondary winding 6.

Starting from a condition in which the lead 11 has just been connected to the battery 8 or a manipulable control switch (not shown) in the lead 27 has just been closed, the operation of the system is as follows: The circuit which is thus completed is from battery 8, through lead 7, winding 5, lead 9, lead 28, coil 21 and lead 27 back to battery and the resultant flow of current energizes the electromagnet 19 and causes the armature 25 to swing toward the contacts 10, 15. When contact 12 engages contact 10 a circuit shunting out the coil 21 is completed. With the shunting out of the coil 21, a supply circuit for the primary winding 5 is completed having a much lower resistance and a surge of current flows through the primary 5 of the induction coil. This building up of current in the primary induces a half cycle of current in the secondary.

Simultaneously with the engagement of the contact 10, the common contact 12 also engages the contact 15 completing the load circuit of the secondary winding 6 through leads 16 and 17. The half cycle of current induced in the secondary 6 by the surge of current in the primary 5 is thus free to flow through the filter 13 to load.

The effective deenergization of the electromagnet 19 by closing the shunt circuit frees the armature 25 to swing toward its normal position thereby breaking the engagement of contact 12 with contacts 10 and 15. The electromagnet is thereupon reenergized and the armature attracted to start a new cycle of operation. With the coil 21 again placed in series with the winding 5, as a result of the opening of contacts 10 and 12, the current flowing through the winding 5 is decreased. However, the half cycle of current induced in the secondary 6 by this decrease of current in the primary can not flow to load because the secondary winding circuit through contacts 12 and 15 is broken. Thus only one half of the current wave induced in the secondary 6 is picked up with a resultant unidirectional flow of high potential current to load.

It can thus be seen that I have perfected an extremely simple and compact system for the transformation of direct current of one potential to direct current of a different potential. The system has a high operating efficiency, employs a minimum of simple circuits and has but a single moving part controlling the circuits.

I claim as my invention:

1. A direct current transforming and rectifying system comprising, in combination, an induction coil having a primary and a secondary winding, a source of direct current to be transformed having one terminal connected to one end of the primary winding, an electromagnet having a coil connected in series circuit with said direct current source and the primary winding, a first fixed contact controlling a shunt connection in parallel with the coil of said electromagnet so that completion of said shunt connection effectively deenergizes the electromagnet and causes a surge of current in the primary winding, a second fixed contact connected to one end of the secondary winding, a connection between the other end of the winding and load, and a vibratory contact member driven by said electromagnet and connected to load and to said direct current source, said vibratory contact engaging and disengaging said first and second contacts simultaneously.

2. A direct current transforming and rectifying system comprising, in combination, an induction coil having a primary and a secondary winding, a source of direct current to be transformed having one terminal connected to one end of the primary winding, and mechanical motor-driven means for varying the current supplied by the direct current source and for rectifying the alternating current induced in the secondary winding, comprising a first contact connected to the remaining end of said primary winding, a second contact connected to one end of the secondary winding, the other end of the secondary winding having one output lead connected thereto, a common vibratory contact connected to the remaining terminal of said direct current source and having another output lead therefrom, and an electromagnet for vibrating said common contact into simultaneous engagement with said first and second contacts.

EDWARD L. BARRETT.